April 9, 1929. W. R. UGGLA ET AL 1,708,000

ELECTRIC GEARING MOTOR WITH CENTRIFUGAL CLUTCH

Filed June 27, 1927

W. R. Uggla and
A. G. F. Wallgren
By Marks & Clerk
Attys.

Patented Apr. 9, 1929.

1,708,000

UNITED STATES PATENT OFFICE.

WILHELM ROBERT UGGLA, OF MORBY, STOCKSUND, AND AUGUST GUNNAR FERDINAND WALLGREN, OF STOCKHOLM, SWEDEN.

ELECTRIC GEARING MOTOR WITH CENTRIFUGAL CLUTCH.

Application filed June 27, 1927, Serial No. 201,815, and in Sweden August 14, 1926.

Centrifugal clutches for the transmitting of the power has previously been provided at electric motors. Clutches of this type permit the starting of the motor without load and short circuited but regarding the protection of the motor against sudden strains the centrifugal clutch is without importance, because electric motors frequently are connected with the power transmitting shaft by a belt. The said belt constitutes itself a friction device which protects the motor. Electric motors together with a toothed gearing for the reducing of the velocity and a friction clutch have also been proposed and used in such cases, as the driven machine, for instance a stone-crusher, digging machine etc. runs in a thrusting manner. In such cases, however, motor, gearing and clutch were separated from each other and not combined to an aggregate, which rendered the mounting correspondingly laborious and expensive, and besides the combination requires great space. In order to remove the said drawbacks the motor, bearing and clutch according to this invention are combined to an aggregate, through which arrangement space is spared, uniformity is gained and gearing motors with centrifugal clutch of standard type may be manufactured and used. In the said aggregate the clutch transmits power from the rotor to the gearing and in order that the aggregate may require the smallest possible space and a simple construction may be gained the clutch is located on the opposite side of the rotor with regard to the gearing.

Figure 1:
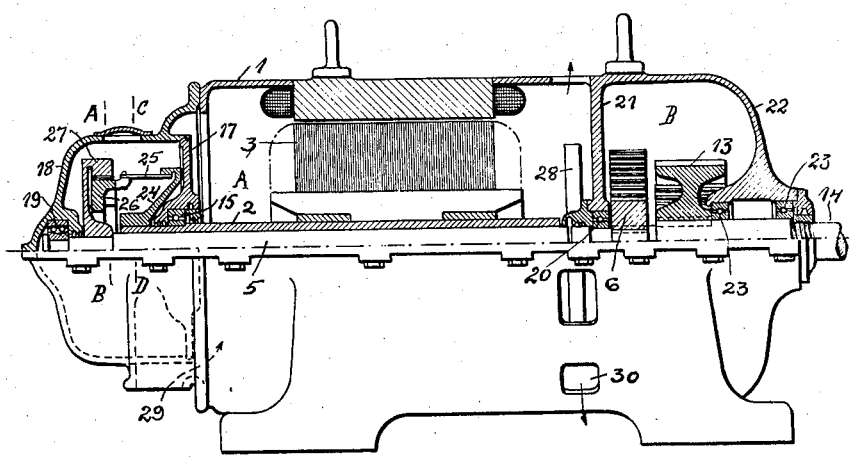
Figure 2:
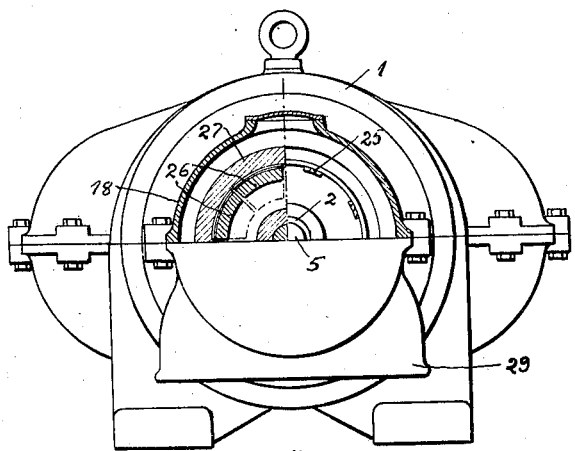
Figure 3:
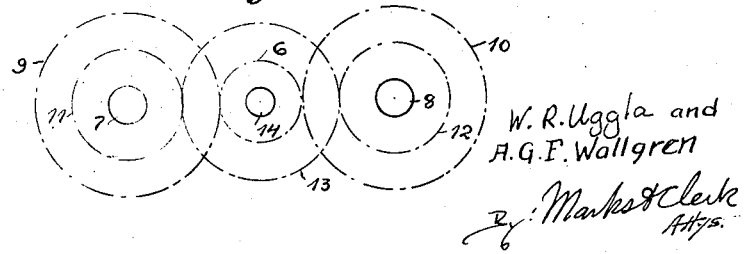

Fig. 1 of the accompanying drawing shows in a longitudinal section a gearing motor with centrifugal clutch. Fig. 2 is an end view of the gearing motor and shows at the left hand side the said clutch in section on the line A—B in Fig. 1 and at the right hand side a section on the line B—C in the same figure. Fig. 3 shows the gearing diagrammatically and in an end view. The electric motor A and toothed gearing B are mounted in a casing 1 common to the same. The shaft 2 of the rotor 3 and the shaft 5 driven by the same are located co-axially in the form of execution shown as an example in the drawing. The shaft 2 rotates by means of a centrifugal clutch shown at the left hand side of Fig. 1 and described below the shaft 5, which extends through the sleeve shaped shaft 2 and at its right end carries the driving pinion 6 of the gearing B. The said gearing may be of any suitable construction and comprises according to the drawing two auxiliary shafts 7 and 8, carrying toothed wheels 9 and 10 respectively meshing with the pinion 6, and pinions 11 and 12 meshing with a toothed wheel 13, which is provided on the outgoing, driven shaft 14. The shaft 2 is journaled in a ball bearing 15, provided in a wall 17 fixed to the cup shaped cover 18 of the casing 1, and the shaft 5 is journalled in ball bearings 19 and 20 arranged in the said cover 18 and in a partition wall 21, located in the casing 1. The auxiliary shafts 7 and 8 are journaled in bearings provided in the said partition wall 21 and in the end wall 22 of the casing 1, and the driven shaft 14 finally is journalled in ball bearings 23 provided in the said end wall 22. All the said bearings are located in the same horizontal plane at which the casing 1 and its cover 18 are divided, so that after the removing of the top part of the casing and the cover the bearings and also the clutch provided in the cover 18 are free for inspection, adjusting and repairing. The clutch shown in the drawing consists of a frictional clutch, which is caused to operate by the centrifugal force. To the shaft 2 of the rotor 3 a disc 24 is connected, to which for instance eight plate springs 25 are fixed, each carrying a block 26 covered with a friction increasing material. While the shaft 2 is rotated, the said blocks 26 are swung outwards by the centrifugal power and forced against the inner side of a drum 27 fixed on the shaft 5. The stiffness of the springs 25 peripherally is so adapted, that the springs bring with themselves the drum 27 and thus transmit the motive power from the shaft 2 of the rotor 3 to the shaft 5. A fan 28 fixed to the shaft 2 causes air entering at 29 to pass through the casing, cooling the motor. The said cooling air leaves the casing through openings 30. The admission opening 29 for the cooling air is provided in the cover 18, so that the air sweeps partially round the cover 18 and thus cools the same and the centrifugal clutch. Owing to the described arrangement the clutch is hermetically enclosed which is of importance when the gearing motor operates in such places, in which there exist explosive gases or matters, for instance in mines, powder-factories etc. Ignition through sparks effected by the clutch is thus excluded.

As perceived from the drawing and the above specification, the motor, clutch and gearing constitute a whole or an aggregate, which may be manufactured and sold in certain standard types, ready for immediate use. Through the providing of the clutch in such manner, that it transmits the motive power to the toothed gearing in order to be then further transmitted through the latter, the gearing is protected against injurious strains, owing to the fact that in the case of overloading the clutch slides. The cover 18 enclosing the clutch may, evidently be divided on a vertical plane for rendering possible a simple dismounting. The cover enclosing the clutch may, if wanted, be made integral with casing of the gearing motor. Other centrifugal clutches of known or suitable construction may, evidently, be substituted for the clutch shown in the drawing.

We claim:

1. The combination of an electric motor, a gearing provided in the casing of the motor and disposed at one end of its rotor, a hollow shaft carrying the rotor, and a centrifugal clutch provided at the opposite end of the rotor and having one part connected to the shaft of the rotor and its other part connected to a shaft, extending through the shaft of the rotor, the driving member of the said gearing being connected to the shaft last mentioned.

2. The combination of an electric motor, a gearing provided in the same casing as the motor and at the one end of its rotor, a hollow shaft carrying the rotor, a centrifugal clutch provided at the opposite end of the rotor and having one part connected to the shaft of the rotor and its other part connected to a shaft extending through the shaft of the rotor, the driving member of the said gearing being connected to the shaft last mentioned, and a casing connected to the casing of the motor and enclosing the clutch, said casing enclosing the clutch being divided on a plane extending longitudinally of the clutch.

3. The combination of an electric motor, a gearing provided in the same casing as the motor and at the one end of its rotor, a hollow shaft carrying the rotor, a centrifugal clutch provided at the opposite end of the rotor and having one part connected to the shaft of the rotor and its other part connected to a shaft extending through the shaft of the rotor, the driving member of the said gearing being connected to the shaft last mentioned, and a casing connected to the casing of the motor and enclosing the clutch, an opening admitting air for the ventilation of the motor being provided in the casing enclosing the clutch.

In testimony whereof we have hereunto affixed our signatures.

WILHELM ROBERT UGGLA.
AUGUST GUNNAR FERDINAND WALLGREN.